(12) United States Patent
Koide et al.

(10) Patent No.: US 12,455,473 B2
(45) Date of Patent: Oct. 28, 2025

(54) LIQUID CRYSTAL DISPLAY DEVICE

(71) Applicant: Sharp Display Technology Corporation, Kameyama (JP)

(72) Inventors: Takako Koide, Kameyama (JP); Takashi Satoh, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 21 days.

(21) Appl. No.: 18/636,694

(22) Filed: Apr. 16, 2024

(65) Prior Publication Data

US 2024/0385478 A1 Nov. 21, 2024

(30) Foreign Application Priority Data

May 19, 2023 (JP) .................................. 2023-083201

(51) Int. Cl.
*G02F 1/1335* (2006.01)

(52) U.S. Cl.
CPC .. *G02F 1/133555* (2013.01); *G02F 1/133512* (2013.01); *G02F 1/133514* (2013.01)

(58) Field of Classification Search
CPC ......... G02F 1/133514; G02F 1/133512; G02F 1/133555
See application file for complete search history.

(56) References Cited

U.S. PATENT DOCUMENTS

| | | | | |
|---|---|---|---|---|
| 2004/0032552 | A1* | 2/2004 | Kim | G02F 1/133371 349/113 |
| 2004/0135945 | A1* | 7/2004 | Choi | G02F 1/13394 349/114 |
| 2007/0008466 | A1* | 1/2007 | Horiguchi | G02F 1/133514 349/113 |
| 2012/0062812 | A1* | 3/2012 | Wu | G02F 1/133555 349/43 |
| 2014/0175469 | A1* | 6/2014 | Dozen | H10K 59/122 257/89 |
| 2016/0178963 | A1* | 6/2016 | Itou | G02F 1/134309 257/72 |
| 2016/0334664 | A1* | 11/2016 | Zhuang | H10D 86/60 |
| 2017/0059942 | A1* | 3/2017 | Son | G02F 1/133753 |
| 2018/0348553 | A1* | 12/2018 | Koide | G02F 1/1396 |

FOREIGN PATENT DOCUMENTS

| | | |
|---|---|---|
| JP | 2004-102243 A | 4/2004 |
| JP | 2009-109804 A | 5/2009 |

* cited by examiner

*Primary Examiner* — Jennifer D. Carruth
*Assistant Examiner* — Agnes Dobrowolski
(74) *Attorney, Agent, or Firm* — Keating & Bennett, LLP

(57) ABSTRACT

Provided is a liquid crystal display device including: a first substrate; a second substrate opposite to the first substrate; and a liquid crystal layer between the first substrate and the second substrate, and includes pixels arranged in a matrix pattern. The pixels each include a reflective region in which display is provided in a reflective mode and a transmissive region in which display is provided in a transmissive mode. At least one of the pixels further includes a light blocking region inside the transmissive region. The second substrate includes a second substrate side insulating layer and a color filter layer sequentially toward the liquid crystal layer. The second substrate side insulating layer is placed in the reflective region and the light blocking region. A film thickness of the color filter layer in the transmissive region is greater than a film thickness of the color filter layer in the reflective region.

15 Claims, 11 Drawing Sheets

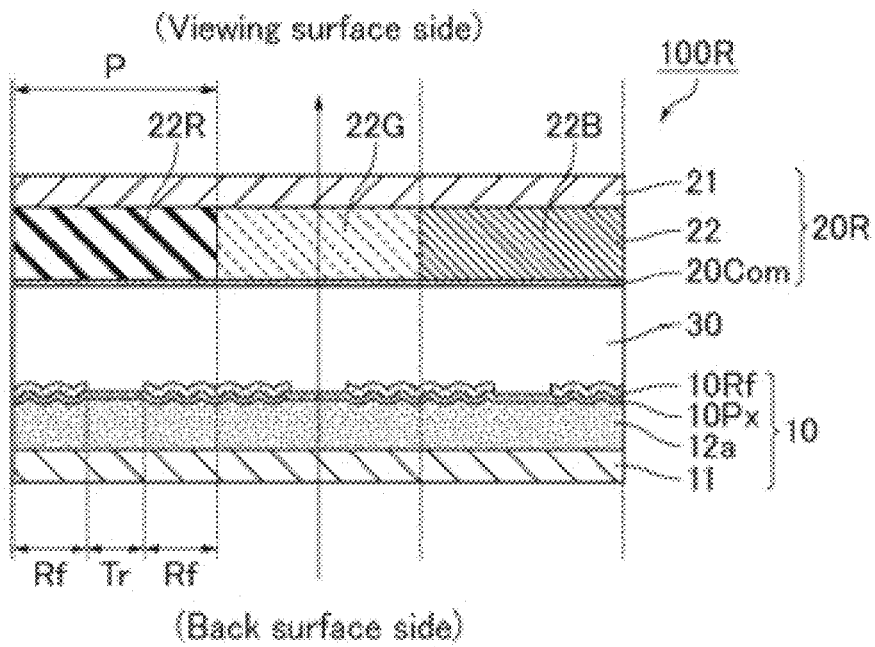
FIG. 12 -Prior Art-
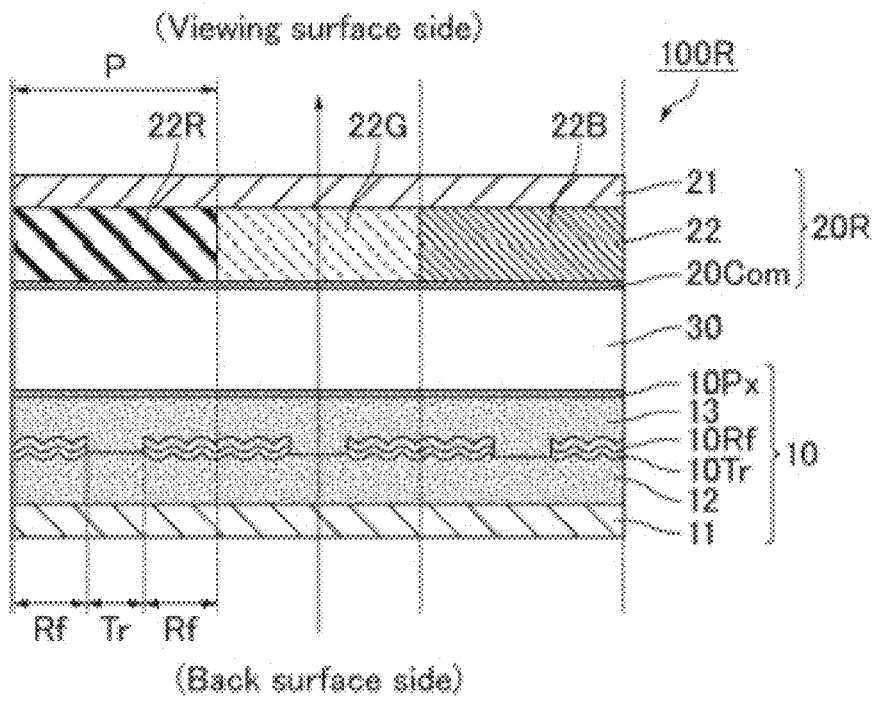
FIG. 13 -Prior Art-

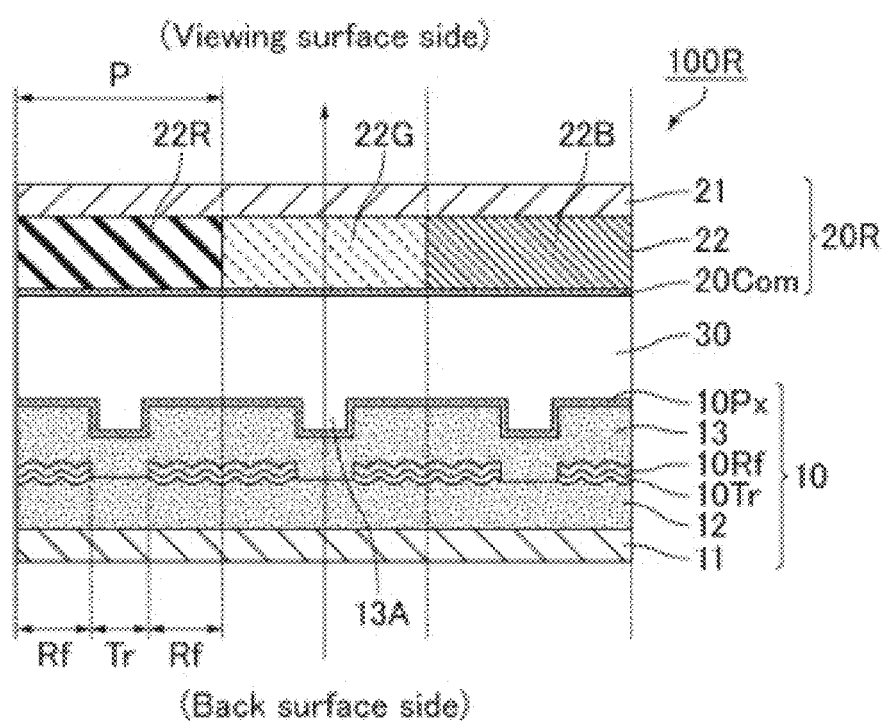

LIQUID CRYSTAL DISPLAY DEVICE

CROSS-REFERENCE TO RELATED APPLICATIONS

The present application claims priority under 35 U.S.C. § 119 to Japanese Patent Application No. 2023-083201 filed on May 19, 2023, the contents of which are incorporated herein by reference in their entirety.

BACKGROUND OF THE INVENTION

Field of the Invention

The following disclosure relates to liquid crystal display devices.

Description of Related Art

Liquid crystal display devices are roughly divided into reflective and transmissive liquid crystal display devices depending on how light passes through the liquid crystal layer. Reflective liquid crystal display devices include a reflector therein and provide display by reflecting light incident thereon from the outside with the reflector and causing the reflected light to pass through the liquid crystal layer. Transmissive liquid crystal display devices include a backlight unit and provide display by causing light emitted from the backlight unit to pass through the liquid crystal layer.

Reflective liquid crystal display devices, which use no backlight unit, can achieve low power consumption, reduction in thickness, and reduction in weight. Meanwhile, transmissive liquid crystal display devices, which include a light source inside, exhibit favorable viewability in dark environment. Liquid crystal display devices having these advantages of both reflective and transmissive liquid crystal displays in consideration of viewability not only under indoor conditions but also under external light, called transflective liquid crystal display devices, have recently emerged.

Transflective liquid crystal display devices, for example, include in each pixel a reflective region in which display is provided in a reflective mode (reflective display) and a transmissive region in which display is provided in a transmissive mode (transmissive display). Transflective liquid crystal display devices thus exhibit high viewability under sunlight in outdoor environments owing to the reflective display using external light and allow viewing of information at night owing to the transmissive display using the backlight.

Techniques relating to transflective liquid crystal display devices include, for example, the method of producing a color filter disclosed in JP 2009-109804 A. The method includes the steps of: (a) forming a colored layer by applying a photosensitive resin to a substrate; (b) forming a first region and a second region with a smaller film thickness than the first region in the colored layer by patterning the colored layer through exposure of the colored layer to light using a mask with a light blocking film patterned with a resolution not higher than the resolution limit of the exposure machine, followed by developing; (c) applying a photosensitive resin to the colored layer; and (d) forming a multigap layer by patterning the photosensitive resin.

JP 2004-102243 A discloses a transflective liquid crystal display device, comprising: first and second substrates facing into each other, each of the first and second substrates having reflective and transmissive portions; a buffer layer formed on an inner surface of the first substrate, the buffer layer having a first transmissive hole at the transmissive portion; a color filter layer on the buffer layer and the first substrate, wherein a total thickness of the color filter layer and the buffer layer of the reflective portion is thicker than a thickness of the color filter layer of the transmissive portion; a common electrode on the color filter layer; a pixel electrode at the reflective and transmissive portions; a reflecting layer at the reflective portion, the reflecting layer having a second transmissive hole at the transmissive portion; and a liquid crystal layer between the common electrode and the pixel electrode.

BRIEF SUMMARY OF THE INVENTION

FIG. 12 to FIG. 14 are each a schematic cross-sectional view showing an example of a conventional transflective liquid crystal display device. Transflective liquid crystal display devices as shown in FIG. 12 to FIG. 14 have recently been applied to smartwatches and mobile phones. Transflective liquid crystal display devices 100R shown in FIG. 12 to FIG. 14 include in each pixel P a transmissive region Tr in which transmissive display is displayed and a reflective region Rf in which reflective display is provided.

The transflective liquid crystal display devices 100R shown in FIG. 12 to FIG. 14 each include a first substrate 10 having thin film transistors (TFTs), a second substrate 20R opposite to the first substrate 10, and a liquid crystal layer 30 held between the first substrate 10 and the second substrate 20. The liquid crystal layer 30 contains twist-aligned liquid crystal molecules. The second substrate 20R includes a supporting substrate 21, a color filter layer 22 including red color filters 22R, green color filters 22G, and blue color filters 22B, and a counter electrode 20Com, sequentially toward the liquid crystal layer 30.

The first substrate 10 shown in FIG. 12 includes a supporting substrate 11 such as a glass substrate, an insulating layer 12a, pixel electrodes 10Px, and a reflective layer 10Rf, sequentially toward the liquid crystal layer 30.

The first substrates 10 shown in FIG. 13 and FIG. 14 both include a supporting substrate 11 such as a glass substrate, a first insulating layer 12, transparent electrodes 10Tr, a reflective layer 10Rf, a second insulating layer 13, and pixel electrodes 10Px, sequentially toward the liquid crystal layer 30. The pixel electrodes 10Px in FIG. 13 are flat, while the second insulating layer 13 in FIG. 14 is provided with transmissive grooves 13A in the transmissive regions Tr.

Including in each pixel P a reflective region Rf in which reflective display is provided and a transmissive region Tr in which transmissive display is provided, the transflective liquid crystal display devices 100R exhibit high viewability under sunlight in outdoor environments owing to the reflective display and allow viewing of information at night owing to the transmissive display using the backlight. However, the transmissive display provided by the conventional transflective liquid crystal display devices 100R has a narrow color gamut (low NTSC ratio).

JP 2009-109804 A and JP 2004-102243 A do not disclose a technique that achieves a wide color gamut.

In response to the above issues, an object of the present invention is to provide a liquid crystal display device capable of achieving a wide color gamut.

(1) One embodiment of the present invention is directed to a liquid crystal display device including: a first substrate; a second substrate opposite to the first substrate; and a liquid crystal layer between the first substrate and the second substrate, the liquid crystal display device including pixels arranged in a matrix pattern, the pixels each including a reflective region in which display is provided in a reflective mode and a transmissive region in which display is provided in a transmissive mode, at least one of the pixels further including a light blocking region inside the transmissive region, the second substrate including a second substrate side insulating layer and a color filter layer sequentially toward the liquid crystal layer, the second substrate side insulating layer being placed in the reflective region and the light blocking region, a film thickness of the color filter layer in the transmissive region being greater than a film thickness of the color filter layer in the reflective region.

(2) In an embodiment of the present invention, the liquid crystal display device includes the structure (1), and a film thickness of the color filter layer in the transmissive region in the at least one pixel including the light blocking region is greater than a film thickness of the color filter layer in the transmissive region in any of the pixels without the light blocking region.

(3) In an embodiment of the present invention, the liquid crystal display device includes the structure (1) or (2), and a film thickness of the second substrate side insulating layer in the reflective region is 0.5 times or more and 2 times or less a film thickness of the color filter layer in the reflective region.

(4) In an embodiment of the present invention, the liquid crystal display device includes the structure (1), (2), or (3), and a film thickness of the second substrate side insulating layer in the light blocking region is 0.5 times or more and 2 times or less a film thickness of the color filter layer in the light blocking region.

(5) In an embodiment of the present invention, the liquid crystal display device includes the structure (1), (2), (3), or (4), the pixels including a first pixel including a first pixel electrode, a second pixel including a second pixel electrode, and a third pixel including a third pixel electrode, and the first pixel electrode is electrically connected to the third pixel electrode.

(6) In an embodiment of the present invention, the liquid crystal display device includes the structure (5), and the first pixel, the second pixel, and the third pixel each define a sub-pixel.

(7) In an embodiment of the present invention, the liquid crystal display device includes the structure (5) or (6), the second pixel electrode is adjacent to the first pixel electrode, and the third pixel electrode is placed on a side of the second pixel electrode opposite to the first pixel electrode.

(8) In an embodiment of the present invention, the liquid crystal display device includes the structure (1), (2), (3), (4), (5), (6), or (7), and the first substrate includes a light blocker placed in the light blocking region, a reflective layer placed in the reflective region, an insulating layer placed on a liquid crystal layer side of the reflective layer, and a pixel electrode placed on a liquid crystal layer side of the insulating layer.

(9) In an embodiment of the present invention, the liquid crystal display device includes the structure (8), and the insulating layer is provided with a transmissive groove in the transmissive region.

(10) In an embodiment of the present invention, the liquid crystal display device includes the structure (1), (2), (3), (4), (5), (6), (7), (8), or (9), and the first substrate includes a light blocker placed in the light blocking region, a reflective layer placed in the reflective region, and a pixel electrode placed on a side of the reflective layer opposite to the liquid crystal layer.

(11) In an embodiment of the present invention, the liquid crystal display device includes the structure (1), (2), (3), (4), (5), (6), (7), (8), (9), or (10), and a thickness of the liquid crystal layer in the transmissive region is greater than a thickness of the liquid crystal layer in the reflective region.

The present invention can provide a liquid crystal display device capable of exhibiting a wide color gamut.

BRIEF DESCRIPTION OF THE DRAWINGS

FIG. 12 is a schematic cross-sectional view showing an example of a conventional transflective liquid crystal display device.

FIG. 13 is a schematic cross-sectional view showing an example of a conventional transflective liquid crystal display device.

FIG. 14 is a schematic cross-sectional view showing an example of a conventional transflective liquid crystal display device.

DETAILED DESCRIPTION OF THE INVENTION

Hereinafter, embodiments of the present invention are described. The present invention is not limited to the contents of the following embodiments. The design may be modified as appropriate within the range satisfying the configuration of the present invention. In the following description, components having the same or similar functions in different drawings are commonly provided with the same reference sign so as to appropriately avoid repetition of description. The structures in the present invention may be combined as appropriate without departing from the gist of the present invention.

Embodiment 1

Figure 1:
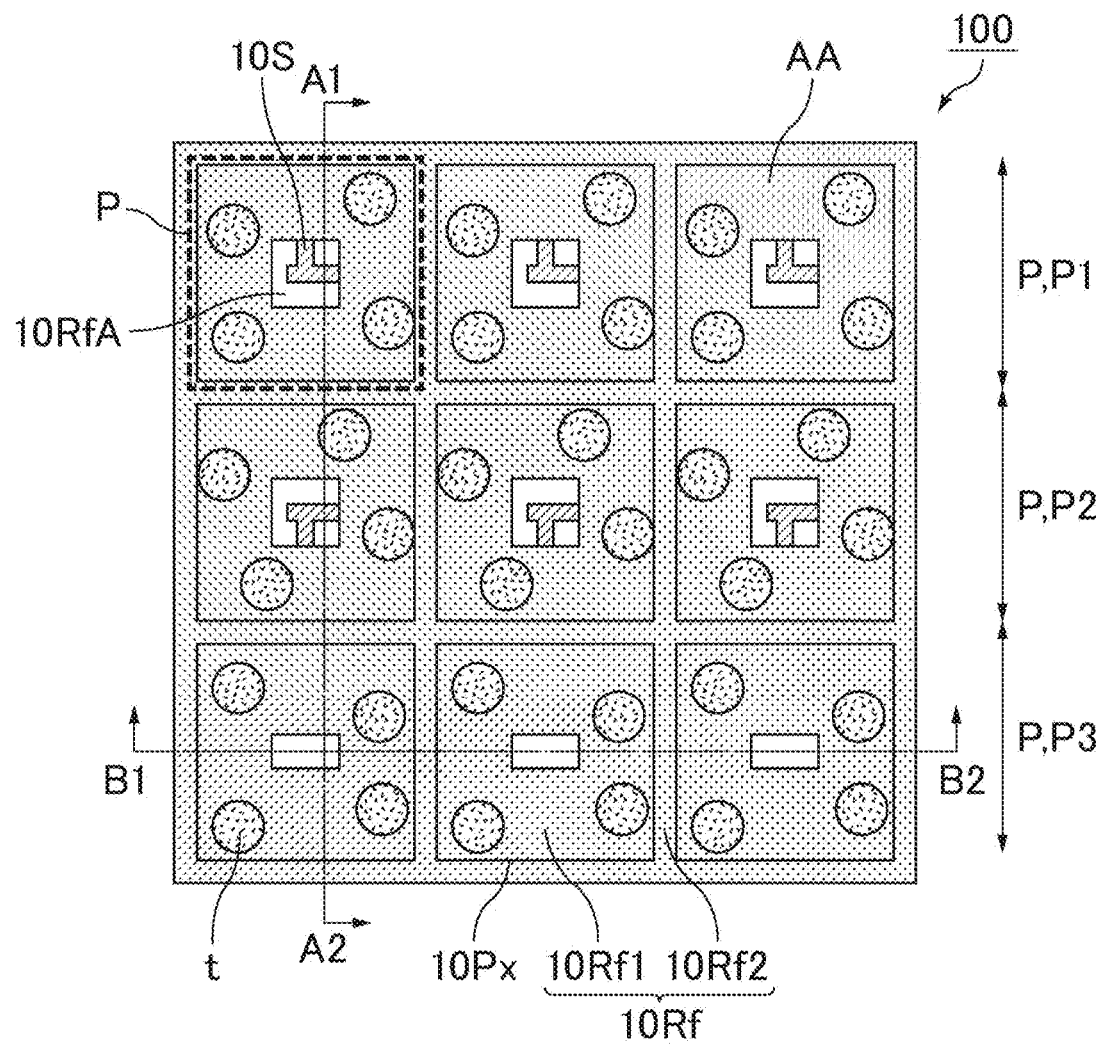
FIG. 1 is a schematic plan view of a liquid crystal display device of Embodiment 1.
Figure 2:
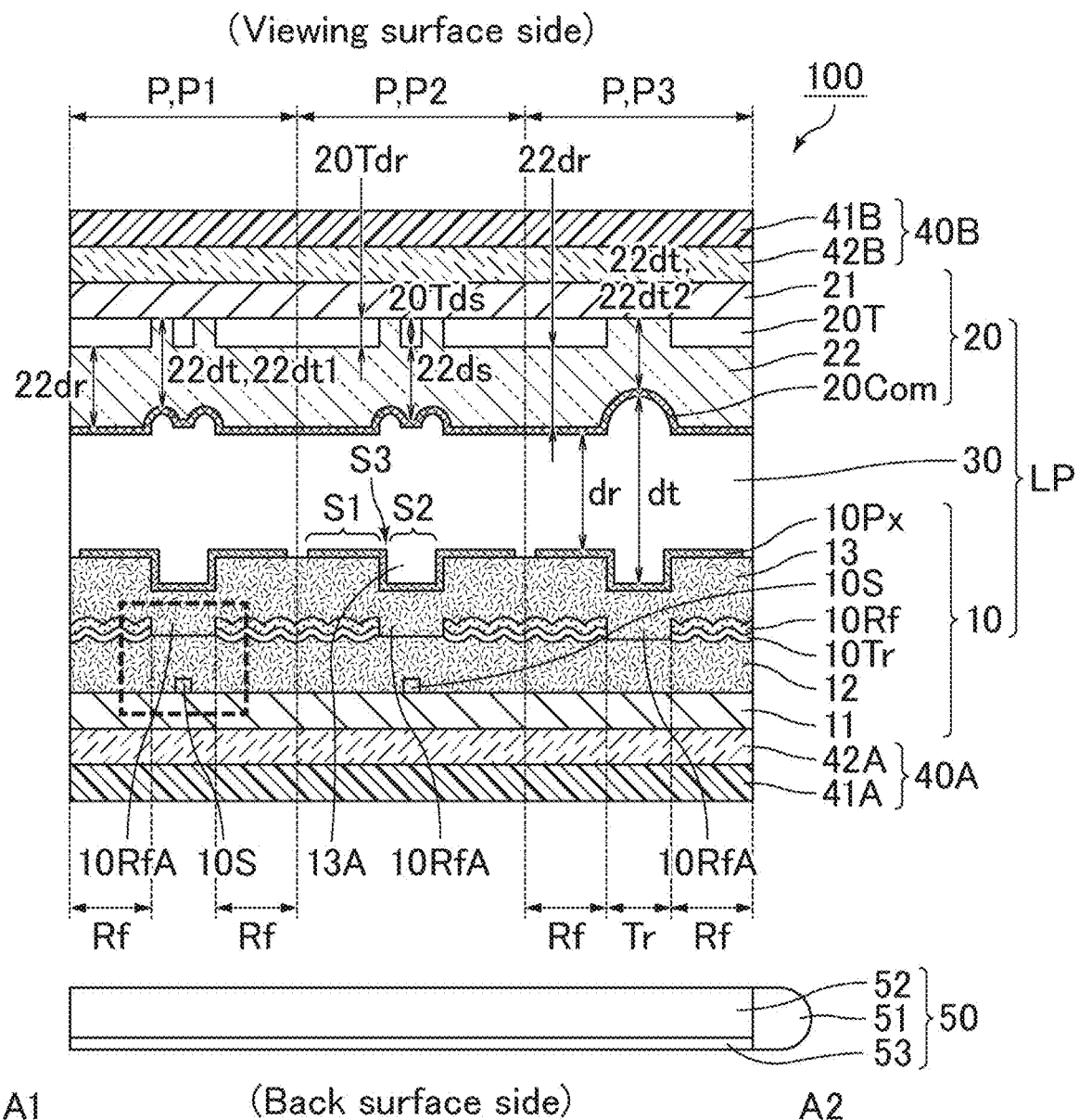
FIG. 2 is a schematic cross-sectional view taken along line A1-A2 in FIG. 1.
Figure 3:
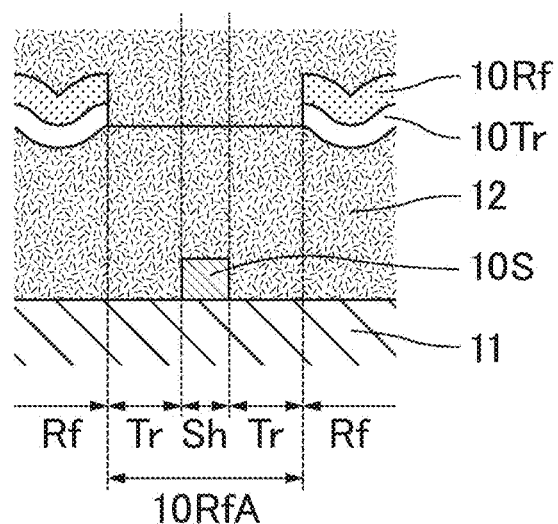
FIG. 3 is an enlarged schematic cross-sectional view of the region surrounded by the dashed line in FIG. 2.

FIG. 1 is a schematic plan view of a liquid crystal display device of Embodiment 1. FIG. 2 is a schematic cross-sectional view taken along line A1-A2 in FIG. 1. FIG. 3 is an enlarged schematic cross-sectional view of the region surrounded by the dashed line in FIG. 2. A liquid crystal display device 100 of the present embodiment is described with reference to FIG. 1 to FIG. 3.

As shown in FIG. 1 to FIG. 3, the liquid crystal display device 100 of the present embodiment includes a first substrate 10, a second substrate 20 opposite to the first substrate 10, and a liquid crystal layer 30 between the first substrate 10 and the second substrate 20. The liquid crystal display device includes pixels P arranged in a matrix pattern. The pixels P each include a reflective region Rf in which display is provided in a reflective mode and a transmissive region Tr in which display is provided in a transmissive mode. At least one of the pixels P further includes a light blocking region Sh inside the transmissive region Tr. The second substrate 20 includes a second substrate side insulating layer 20T and a color filter layer 22 sequentially toward the liquid crystal layer 30. The second substrate side insulating layer 20T is placed in the reflective regions Rf and the light blocking regions Sh. Film thicknesses 22dt of the color filter layer 22 in the transmissive regions Tr are greater than a film thickness 22dr of the color filter layer 22 in the reflective regions Rf. This configuration enables a wide color gamut. In particular, the configuration can widen the color gamut during transmissive display. The liquid crystal display device 100 of the present embodiment is a multi-cell gap transflective liquid crystal display device in which liquid crystal molecules in the reflective region Rf and the transmissive region Tr are driven by the same pixel electrode, the second substrate side insulating layer 20T (e.g., transparent resin) is placed in the reflective regions Rf (regions with a reflective layer 10f described later) and the light blocking regions Sh (regions with a light blocker 10S described later) in the second substrate 20, and the color filter layer 22 (color layer) is placed on the second substrate side insulating layer 20T.

The color gamut (NTSC ratio) can be determined by measuring the RGB luminance values of a liquid crystal display panel of interest placed on a backlight using a luminance meter (e.g., spectroradiometer SR-UL2 available from Topcon Technohouse Corporation). The NTSC ratio of the liquid crystal display device 100 of the present embodiment is higher than those of conventional liquid crystal display devices.

The liquid crystal display device 100 of the present embodiment is a transflective (transmissive-reflective) liquid crystal display device. The liquid crystal display device 100, as shown in FIG. 1, includes pixels P. The pixels P are arranged in a matrix pattern with rows and columns. FIG. 1 shows regions corresponding to nine pixels P in the liquid crystal display device 100. The pixels P typically include red pixels for red display, green pixels for green display, and blue pixels for blue display.

The liquid crystal display device 100, as shown in FIG. 2, a liquid crystal display panel LP and a backlight (lighting system) 50 placed on or behind the back surface side (side opposite to the viewing surface side) of the liquid crystal display panel LP. The liquid crystal display panel LP includes a first substrate (TFT substrate) 10, a second substrate (counter substrate) 20 opposite to the first substrate 10, and a vertical alignment liquid crystal layer 30 between the first substrate 10 and the second substrate 20.

Each pixel P includes a reflective region Rf in which display is provided in a reflective mode and a transmissive region Tr in which display is provided in a transmissive mode. At least one of the pixels P further includes a light blocking region Sh inside the transmissive region Tr. The number of pixels P including a light blocking region Sh is preferably 0.5 times or more and 5 times or less, more preferably 1.0 times or more and 4.5 times or less, still more preferably 1.5 times or more and 4 times or less, the number of pixels P without the light blocking region Sh.

The first substrate 10 includes the reflective layer 10Rf provided with apertures 10RfA in the respective pixels P and the light blockers 10S each overlapping at least one of the apertures 10RfA in a plan view. In a plan view, a region overlapping the reflective layer 10Rf corresponds to a reflective region Rf and reflective display can be provided in this region. In a plan view, a region overlapping an aperture 10RfA and not overlapping a light blocker 10S corresponds to a transmissive region Tr and transmissive display can be provided in this region. In a plan view, a region overlapping a light blocker 10S corresponds to a light blocking region Sh. The light blocking region contributes to neither transmissive display nor reflective display. The apertures 10RfA are not included in the reflective layer 10Rf.

Herein, the reflective regions Rf are regions present within a display region AA and overlapping the reflective layer 10Rf in a plan view. The light blocking regions Sh are regions present within the display region AA and overlapping a light blocker 10S in a plan view. The transmissive regions Tr are regions present within the display region AA and overlapping neither the reflective layer 10Rf nor a light blocker 10S in a plan view.

The three pixels (first pixel P1, second pixel P2, and third pixel P3) shown in FIG. 2 are each provided with an aperture 10RfA. Two of the three apertures 10RfA in the three pixels (the aperture 10RfA in the first pixel P1 and the aperture 10RfA in the second pixel P2) each include a light blocker 10S such as a TFT line as shown in FIG. 2, and thus include a light blocking region Sh.

In a plan view, the second substrate side insulating layer 20T is placed in the reflective regions Rf (regions overlapping the reflective layer 10Rf in a plan view). This configuration can make the film thicknesses 22dt of the color filter layer 22 in the transmissive regions Tr (regions not overlapping the reflective layer 10Rf or a light blocker 10S in a plan view) greater than the film thickness 22dr of the color filter layer 22 in the reflective regions Rf. In other words, placing the second substrate side insulating layer 20T in the second substrate 20 at positions corresponding to the reflective layer 10Rf achieves a multi-gap structure, thickening the color filter layer 22 (color layer) in the transmissive regions Tr. As a result, the color gamut can be widened (e.g., third pixel P3).

The color gamut during transmissive display is narrow (the NTSC ratio is low) in the conventional transflective liquid crystal display devices 100R shown in FIG. 12 to FIG. 14 presumably because transmissive display light passes only once through the color filter layer 22 adjusted to have a low pigment concentration for reflective display. Thus, in the present embodiment, the second substrate side insulating layer 20T is placed in the reflective regions Rf in the second substrate 20 to produce steps in the color filter layer 22 (color layer). In the resulting structure, the film thicknesses 22dt of the color filter layer 22 in the regions without the second substrate side insulating layer 20T in a plan view and the film thickness 22dr of the color filter layer 22 in the regions with the second substrate side insulating layer 20T in a plan view satisfy the relationship 22dt>22dr. In other words, the film thicknesses 22dt of the color filter layer 22 in the transmissive regions Tr are greater than the film thickness 22dr of the color filter layer 22 in the reflective regions Rf.

In a plan view, the second substrate side insulating layer 20T is placed also in the light blocking regions Sh (regions overlapping a light blocker 10S in a plan view). In other words, each of the first pixel P1 and the second pixel P2 including a light blocker 10S such as a TFT line in its region overlapping an aperture 10RfA in a plan view includes the second substrate side insulating layer 20T placed not only in its region overlapping the reflective layer 10Rf but also in its region overlapping the light blocker 10S. This configuration can effectively thicken the color filter layer 22 in the transmissive regions Tr, effectively widening the color gamut.

Preferably, a film thickness 22dt1 of the color filter layer 22 in the transmissive regions Tr in the pixels (first pixel P1 and second pixel P2) including a light blocking region Sh is greater than a film thickness 22dt2 of the color filter layer 22 in the transmissive regions Tr in the pixels (third pixel P3) without a light blocking region Sh. In other words, the color filter layer preferably has film thicknesses satisfying the relationship 22dt1>22dt2>22dr. This configuration can more effectively widen the color gamut. The term "overlap/overlapping" herein means to overlap in a plan view unless otherwise specified, and the term "not overlap/overlapping" means not to overlap in a plan view unless otherwise specified.

JP 2009-109804 A discloses a multi-gap cell in which the insulating layer (multi-gap layer) is placed in the reflective regions on the substrate and the color filter layer (colored layer) is placed on the insulating layer. JP 2009-109804 A employs the multi-gap structure to make the retardation provided by the liquid crystal layer in the transmissive regions larger than the retardation provided by the liquid crystal layer in the reflective regions through which light passes twice while making the colored layer in the transmissive regions thicker than the colored layer in the reflective regions, so that the display performance is enhanced.

The technique disclosed in JP 2009-109804 A, however, puts emphasis on reflective display and provides grayscale division display, thus including conductive lines such TFT lines in the apertures of the reflective electrodes. Thus, simply placing the insulating layer in the reflective regions of the substrate including the colored layer does not sufficiently enhance the display performance in the transmissive regions.

Figure 4:
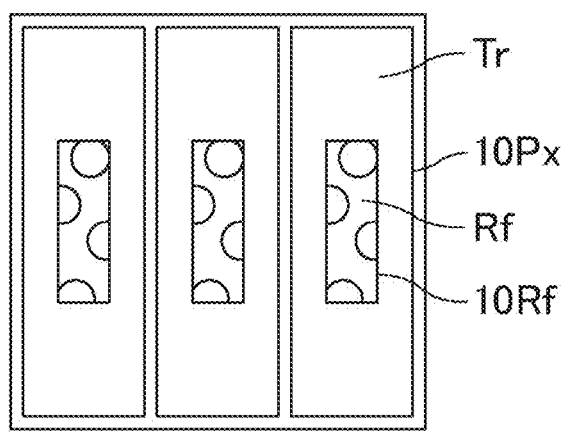
FIG. 4 is an example of a schematic plan view of the liquid crystal display device disclosed in JP 2009-109804 A.

FIG. 4 is an example of a schematic plan view of the liquid crystal display device disclosed in JP 2009-109804 A. As shown in FIG. 4, the liquid crystal display device disclosed in JP 2009-109804 A includes reflective regions Rf with floating-island reflective electrodes and transmissive regions Tr around the respective reflective region Rf. The reflective electrodes in the liquid crystal display device disclosed in JP 2009-109804 A are provided with no aperture. In other words, the pixels in the liquid crystal display device disclosed in JP 2009-109804 A includes the reflective regions inside the respective transmissive regions.

In contrast, the liquid crystal display device 100 of the present embodiment, as shown in FIG. 1, includes the reflective layer 10Rf provided with the apertures 10RfA, wherein the transmissive regions Tr are present in the regions corresponding to the apertures 10RfA and the reflective regions Rf are present in the regions corresponding to the reflective layer 10Rf. In other words, the pixels P in the liquid crystal display device 100 of the present embodiment each include its transmissive region Tr inside its reflective region Rf. Also in this respect, the liquid crystal display device 100 of the present embodiment differs in structure from the liquid crystal display device disclosed in JP 2009-109804 A.

The following describes the liquid crystal display device 100 of the present embodiment in detail.

Figure 5:
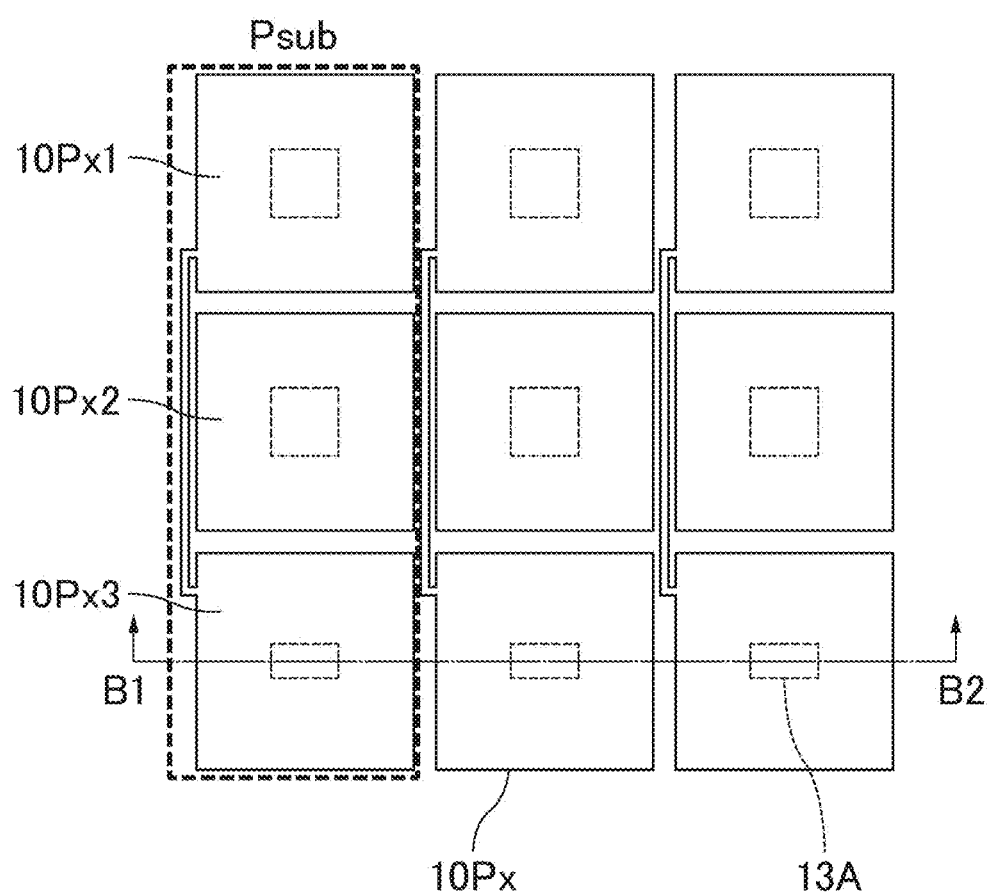
FIG. 5 is a schematic plan view of pixel electrodes in a TFT substrate in Embodiment 1.
Figure 6:
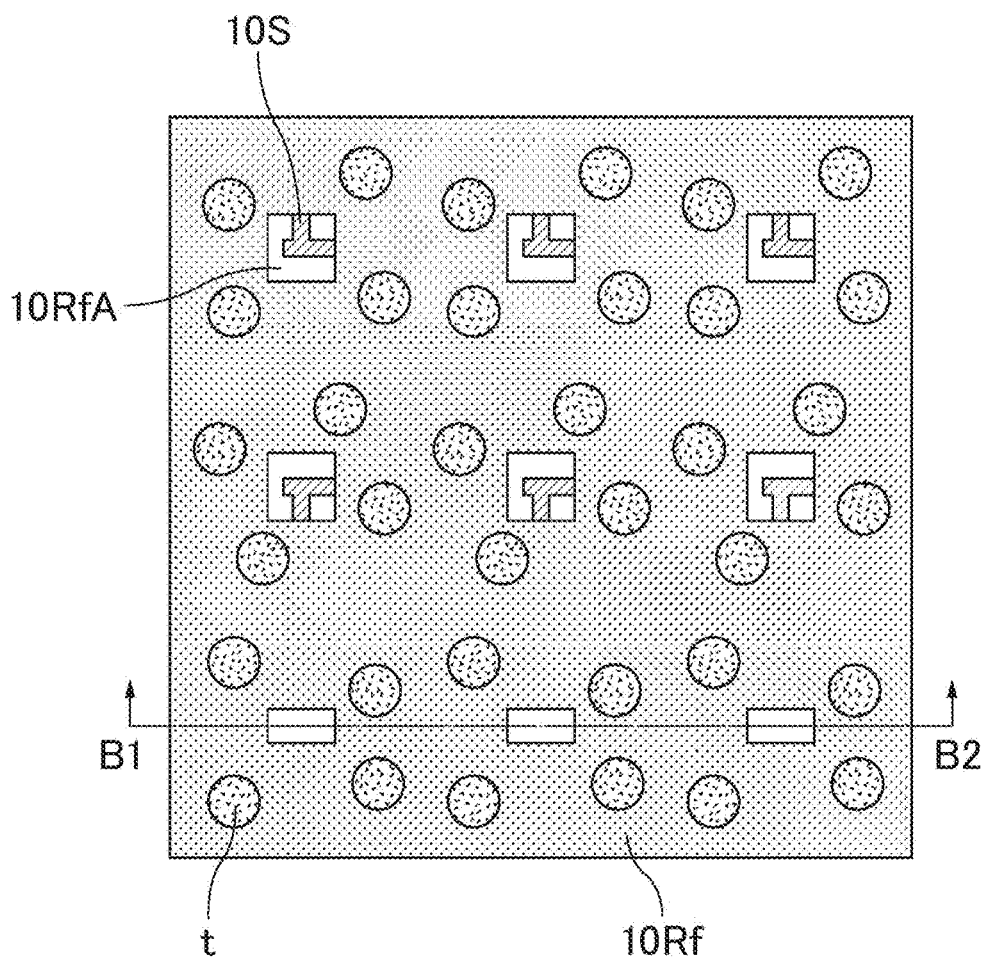
FIG. 6 is a schematic plan view of a reflective layer and light blockers in the TFT substrate in Embodiment 1.
Figure 7:
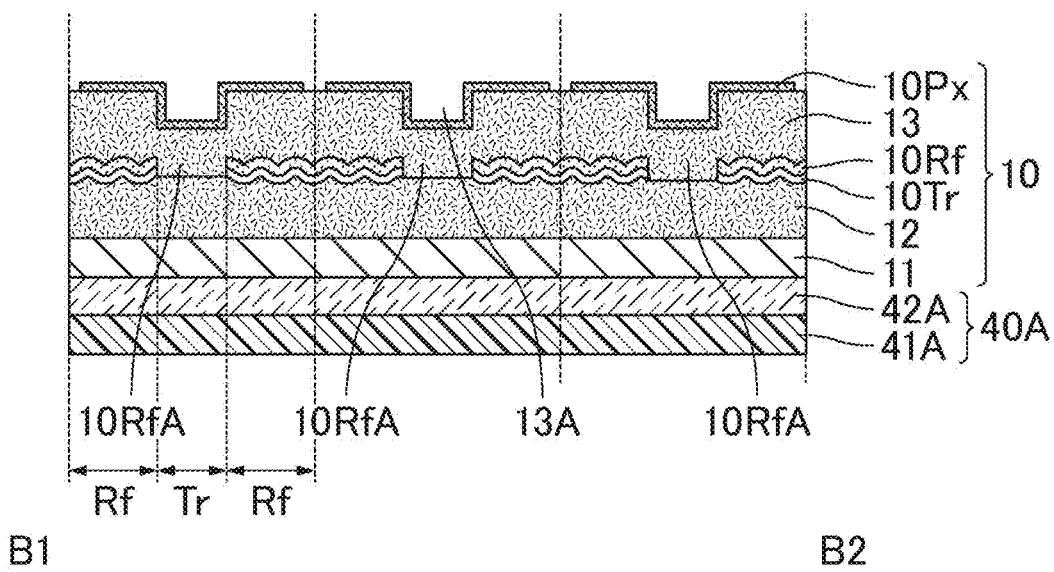
FIG. 7 is a schematic cross-sectional view taken along line B1-B2 in FIG. 1.

FIG. 5 is a schematic plan view of pixel electrodes in a TFT substrate in Embodiment 1. FIG. 6 is a schematic plan view of a reflective layer and light blockers in the TFT substrate in Embodiment 1. FIG. 7 is a schematic cross-sectional view taken along line B1-B2 in FIG. 1.

The liquid crystal display device 100 of the present embodiment includes the pixel electrodes 10Px in the respective pixels P. The pixel electrodes 10Px are placed on the liquid crystal layer 30 side of the reflective layer 10Rf with an insulating film (second insulating layer 13) in between.

As shown in FIG. 5, the pixels P include first pixels P1 including a first pixel electrode 10Px1, second pixels P2 including a second pixel electrode 10Px2, and third pixels P3 including a third pixel electrode 10Px3. The first pixel electrodes 10Px1 are electrically connected to the respective third pixel electrodes 10Px3. This configuration can control voltage applied to a first pixel electrode 10Px1 and the corresponding third pixel electrode 10Px3 independently of voltage applied to the corresponding second pixel electrode 10Px2. As a result, the grayscale value within a sub-pixel Psub defined by the first pixel P1, the second pixel P2, and the third pixel P3 can be changed as shown in the following Table 1, for example. In other words, the liquid crystal display device 100 of the present embodiment is a grayscale-division transflective liquid crystal display device which provides grayscale display using the divided pixel electrodes in each sub-pixel Psub.

TABLE 1

|  | Grayscale value: 0 | Grayscale value: 1 | Grayscale value: 2 | Grayscale value: 3 |
| --- | --- | --- | --- | --- |
| First pixel electrode and third pixel electrode | OFF | OFF | ON | ON |
| Second pixel electrode | OFF | ON | OFF | ON |

As shown in FIG. 5, for example, a second pixel electrode 10Px2 is adjacent to the corresponding first pixel electrode 10Px1, and the corresponding third pixel electrode 10Px3 is opposite to the first pixel electrode 10Px1 across the second pixel electrode 10Px2.

As described above, the liquid crystal display device 100 of the present embodiment employing the grayscale division system includes TFTs that need to input different signals for the grayscale division and contact holes are present in the individual apertures 10RfA. In this case, the configuration employed in JP 2009-109804 A taking no measure to the light blockers 10S such as the TFTs would insufficiently widen the color gamut in the transmissive regions Tr.

The proportion of the area of the transmissive region Tr in each pixel P can appropriately be set according to the application and other conditions, and is 10% or higher and 90% or lower, for example. The position and shape of the transmissive region Tr in the pixel P can also appropriately be set according to the application and other conditions. Herein, a region not contributing to reflective display or transmissive display in the pixel P is called "light blocking region Sh".

The first substrate 10 includes the supporting substrate 11, the first insulating layer 12, the transparent electrodes 10Tr, the reflective layer 10Rf, the second insulating layer 13, and the pixel electrodes 10Px sequentially toward the liquid crystal layer 30.

The components of the first substrate 10 (e.g., the pixel electrodes 10Px described above) are supported by the supporting substrate 11. The supporting substrate 11 is, for example, a transparent substrate. The material of the transparent substrate can be, for example, alkali-free glass or plastic. The term "transparent" herein means being transparent to light. Specifically, the term means that the light (e.g., visible light) transmittance (e.g., parallel ray transmittance) is 80% or higher and 100% or lower.

Circuits (backplane circuits) for driving the pixels P are formed on the supporting substrate 11. The backplane circuits are not limited. For example, the backplane circuits may include memory circuits (e.g., SRAMs) connected to the respective pixels P. A liquid crystal display device including memory circuits for the respective pixels P is sometimes called a "memory liquid crystal".

A specific configuration of a memory liquid crystal is disclosed, for example, in JP 5036864 B (family member in the U.S.: U.S. Pat. No. 8,692,758 B2). The contents of JP 5036864 B and U.S. Pat. No. 8,692,758 B2 are incorporated herein by reference in their entirety. Alternatively, the backplane circuits may include thin film transistors (TFTs) connected to the respective pixel electrodes 10Px as in a typical active matrix substrate. The TFTs of the backplane circuits are an example of the light blockers 10S.

The TFTs are, for example, those including as an active layer an amorphous silicon layer, a polysilicon layer, or an oxide semiconductor layer containing an In—Ga—Zn—O-based semiconductor (see JP 2014-007399 A). The contents of JP 2014-007399 A are incorporated herein by reference in their entirety. The backplane circuits can include, in addition to the memory circuits and TFTs, various conductive lines such as gate lines and source lines.

The first insulating layer 12 covers the backplane circuits. The first insulating layer 12 is a transparent insulating layer, and is formed from a transparent organic insulating material, for example. The surface of the first insulating layer 12 includes irregularities. In other words, the first insulating layer 12 has an irregular surface structure. The first insulating layer 12 having an irregular surface structure can be formed using a photosensitive resin, for example, as described in JP 3394926 B.

The reflective layer 10Rf is formed on the first insulating layer 12. The reflective layer 10Rf is formed from a metal material with a high reflectance. The metal material for forming the reflective layer 10Rf can be, for example, aluminum, silver, a silver alloy, or another metal material.

The surface of the reflective layer 10Rf has an irregular shape reflecting the irregular surface structure of the first insulating layer 12. In other words, the reflective layer 10Rf also has an irregular surface structure. The irregular surface structure of the reflective layer 10Rf is also referred to as a micro reflective structure (MRS) and is provided to diffusively reflect ambient light to achieve display close to that with a paper-white reflectance. The irregular surface structure, for example, can be defined by bumps t randomly arranged with the center-to-center distance between adjacent bumps t being 5 µm or more and 50 µm or less, preferably 10 µm or more and 20 µm or less. In a view from the normal to the display surface, the shape of the bumps t is substantially circular or substantially polygonal. The area of the bumps t occupying the corresponding pixel P is, for example, about 20% to 40%. The height of each bump t is, for example, 1 µm or more and 5 µm or less.

The reflective layer 10Rf includes first parts 10Rf1 positioned in the reflective regions Rf in the pixels P and second parts 10Rf2 each positioned between any adjacent two pixels P. The irregular surface structure of the reflective layer 10Rf is formed in both the first parts 10Rf1 and the second parts 10Rf2. In other words, not only the first parts 10Rf1 but also the second parts 10Rf2 have the irregular surface structure.

The reflective layer 10Rf may not have the irregular surface structure (i.e., may have a flat specular surface). When the reflective layer 10Rf does not have the irregular surface structure, the reflective layer 10Rf can be combined with a light scattering layer to achieve display closer to that with a paper-white reflectance.

The first substrate 10 includes the light blockers 10S in the light blocking regions Sh, the reflective layer 10Rf in the reflective regions Rf, the second insulating layer 13 as the insulating layer placed on the liquid crystal layer 30 side of the reflective layer 10Rf, and the pixel electrodes 10Px placed on the liquid crystal layer 30 side of the second insulating layer 13. The second insulating layer 13 includes the transmissive grooves 13A in the transmissive regions Tr (regions not overlapping the reflective layer 10Rf or a light blocker 10S in a plan view). This configuration can make transmissive cell gaps dt greater than a reflective cell gap dr. As a result, the retardation provided by the liquid crystal layer 30 to light used for display in the transmissive mode can be increased, so that the voltage-luminance characteristics preferred (leading to brighter display) for the transmissive regions Tr can be obtained.

As described above, the second insulating layer 13 covers the reflective layer 10Rf. The second insulating layer 13 is a transparent insulating layer and is formed from a transparent organic insulating material, for example. The second insulating layer 13 has dents (transmissive grooves 13A) formed by photolithography and used to make the transmissive cell gaps dt greater than the reflective cell gap dr.

The transmissive grooves 13A are dents in the liquid crystal layer 30 side surface of the second insulating layer 13. The film thickness of the second insulating layer 13 in regions overlapping the transmissive grooves 13A in a plan view is 0.1 times or more and less than 1.0 times, preferably 0.2 times or more and 0.9 times or less, more preferably 0.3 times or more and 0.8 times or less, the film thickness of the second insulating layer 13 in the other regions. This configuration can achieve voltage-luminance characteristics more preferred (leading to brighter display) for the transmissive regions Tr.

The pixel electrodes 10Px are formed on the second insulating layer 13. In other words, the pixel electrodes 10Px are formed on the reflective layer 10Rf with the second insulating layer 13 in between. The pixel electrodes 10Px are formed from a transparent conductive material. The transparent conductive material can be, for example, indium tin oxide (ITO), indium zinc oxide (IZO®), or a mixture thereof. The pixel electrodes 10Px are electrically connected to the backplane circuits.

The transparent electrodes (transparent conductive layer) 10Tr are present between the reflective layer 10Rf and the first insulating layer 12. The transparent electrodes 10Tr may be omitted. The transparent electrodes 10Tr are formed from a transparent conductive material. The transparent conductive material can be the same as that of the pixel electrodes 10Px.

The second substrate 20 includes the supporting substrate 21, the second substrate side insulating layer 20T, the color filter layer 22, and the counter electrode 20Com sequentially toward the liquid crystal layer 30. The second substrate 20 further includes multiple columnar spacers.

The components (e.g., the counter electrode 20Com described above) of the second substrate 20 are supported by the supporting substrate 21. The supporting substrate 21 is, for example, a transparent substrate. The material of the transparent substrate can be, for example, alkali-free glass or plastic. Preferably, the second substrate 20 does not include a black matrix (light blocking layer) between any adjacent two pixels P.

The second substrate side insulating layer 20T is placed in the reflective regions Rf and the light blocking regions Sh. The second substrate side insulating layer 20T is preferably a transparent insulating layer. The second substrate side insulating layer 20T is formed from a transparent organic insulating material, for example. The second substrate side insulating layer 20T is formed into the desired shape by, for example, applying a resin material transparent to light to the supporting substrate 21 and patterning the applied resin material by the known photolithography technique.

A film thickness 20Tdr of the second substrate side insulating layer 20T in the reflective regions Rf is preferably 0.5 times or more and 2 times or less the film thickness 22dr of the color filter layer 22 in the reflective regions Rf. This configuration can more effectively widen the color gamut during transmissive display. The film thickness 20Tdr is more preferably 0.6 times or more and 1.8 times or less, still more preferably 0.7 times or more and 1.6 times or less, the film thickness 22dr.

The film thickness 20Tds of the second substrate side insulating layer 20T in the light blocking regions Sh is preferably 0.5 times or more and 2 times or less a film thickness 22ds of the color filter layer 22 in the light blocking regions Sh. This configuration can more effectively widen the color gamut for transmissive display. The film thickness 20Tds is more preferably 0.6 times or more and 1.8 times or less, still more preferably 0.7 times or more and 1.6 times or less, the film thickness 22ds.

The counter electrode 20Com is opposite to the pixel electrodes 10Px. The counter electrode 20Com is formed from a transparent conductive material. The transparent conductive material used to form the counter electrode 20Com can be the same material as that used to form the pixel electrodes 10Px. The same electrical potential as the electrical potential (common electrical potential) applied to the counter electrode 20Com, for example, is applied to the reflective layer 10Rf.

The color filter layer 22 typically includes red color filters placed in red pixels, green color filters placed in green pixels, and blue color filters placed in blue pixels. The regions of the color filter layer 22 corresponding to the positions between pixels P of different colors are each substantially equally occupied by color filters of the different colors, for example. An overcoat layer covering the color filter layer 22 may be formed.

The columnar spacers define the thickness (cell gap) of the liquid crystal layer 30. The columnar spacers can be formed from a photosensitive resin.

The liquid crystal layer 30 contains a nematic liquid crystal material with negative dielectric anisotropy and does not contain a chiral agent. The liquid crystal layer 30 can be formed by, for example, one drop filling.

A first alignment film and a second alignment film may be formed respectively between the first substrate 10 and the liquid crystal layer 30 and between the second substrate 20 and the liquid crystal layer 30. The first alignment film and the second alignment film are both in contact with the liquid crystal layer 30. The first alignment film and the second alignment film are each a vertical alignment film, for example. Herein, the "vertical alignment film" may be any alignment film that aligns liquid crystal molecules present near the alignment film substantially vertically to the surface of the alignment film, and can be, for example, an alignment film that provides a pre-tilt angle of 86.0° or greater to the liquid crystal molecules. The main component of the vertical alignment film is preferably, for example, polyimide, polyamic acid, polymaleimide, or polysiloxane. These are members of a polymer group effectively usable as a material of alignment films.

At least one of the first alignment film or the second alignment film has undergone the alignment treatment to define a pre-tilt azimuth. The alignment treatment can be rubbing treatment or photoalignment treatment. Alignment films whose alignment regulating force or alignment direction to be exerted on liquid crystal molecules is changed by the photoalignment treatment (irradiation with/exposure to light) are called "photoalignment films". Photoalignment films preferably contain at least one of a cinnamate group, an azobenzene group, a chalcone group, a stilbene group, or a coumarine group as a photoreactive functional group. This can decrease the possibility of photodegradation product dissolution into the liquid crystal layer 30 to improve the reliability, and also allows photoalignment treatment with relatively low irradiation energy.

The liquid crystal molecules in the liquid crystal layer 30 are vertically aligned with no voltage applied to the liquid crystal layer 30 while horizontally aligned with a predetermined voltage applied to the liquid crystal layer 30. In the present embodiment, the twist angle of the liquid crystal layer 30 is substantially 0° and display is provided in the vertical aligned electrically controlled birefringence (VA-ECB) mode. The expression "the twist angle is substantially 0°" encompasses cases where the twist angle is close to 0° within the range of manufacturing tolerance.

The liquid crystal layer 30 may be one containing a nematic liquid crystal material with positive dielectric anisotropy. In this case, the first alignment film and the second alignment film are horizontal alignment films, and the display mode is the ECB mode.

The liquid crystal display device 100 further includes a pair of circularly polarizing plates (first circularly polarizing plate 40A and second circularly polarizing plate 40B). One of the pair of circularly polarizing plates (first circularly polarizing plate 40A) is placed on the back surface side of the liquid crystal display panel LP, and the other (second circularly polarizing plate 40B) is placed on the viewing surface side of the liquid crystal display panel LP. The first circularly polarizing plate (back circularly polarizing plate) 40A includes a first linearly polarizing plate 41A and a first phase difference plate 42A between the first linearly polarizing plate 41A and the liquid crystal display panel LP. The second circularly polarizing plate (front circularly polarizing plate) 40B includes a second linearly polarizing plate 41B and a second phase difference plate 42B between the second linearly polarizing plate 41B and the liquid crystal display panel LP.

The second linearly polarizing plate (front linearly polarizing plate) 41B is an absorptive linearly polarizing plate. The absorptive linearly polarizing plate can be a linearly polarizing plate including a film polarizer obtained by dying and stretching a polyvinyl alcohol (PVA) film and a triacetyl cellulose (TAC) protective layer; a dye-type polarizing plate; or a coating-type polarizing plate, for example. The absorptive linearly polarizing plate has a transmission axis and an absorption axis orthogonal to the transmission axis.

The first linearly polarizing plate (back linearly polarizing plate) 41A can be an absorptive linearly polarizing plate as with the front linearly polarizing plate 41B. A reflective linearly polarizing plate or a laminate of an absorptive linearly polarizing plate and a reflective linearly polarizing plate may also be used. Examples of the reflective linearly polarizing plate include a multilayer reflective polarizing plate (product name: DBEF) available from 3M Japan Limited, and combinations of a cholesteric liquid crystal film and a λ/4 plate. Unlike absorptive linearly polarizing plates, reflective linearly polarizing plates have a reflection axis orthogonal to their transmission axis. This causes part of light from the backlight 50 to be reflected by the reflective linearly polarizing plate and further reflected by a reflector 53 of the backlight 50 for recycling. The reflective linearly polarizing plate may be included not in the back linearly polarizing plate 41A but in the backlight 50.

The first phase difference plate 42A and the second phase difference plate 42B may each be one λ/4 plate, a combination of one λ/4 plate and one or two λ/2 plates, or a combination of one λ/4 plate and one negative C plate.

The azimuth of the absorption axis of each of the back linearly polarizing plate 41A and the front linearly polarizing plate 41B and the azimuth of the slow axis of each of the first phase difference plate 42A and the second phase difference plate 42B are set to enable display in the normally black mode. The liquid crystal molecules in the liquid crystal layer 30 are vertically aligned in the black display state and fall down at a twist angle of 0° in the white display state (and intermediate display state).

The backlight 50 is placed on or behind the back surface side of the back circularly polarizing plate 40A. The backlight 50 includes light sources (e.g., LEDs) 51, a light guide plate 52 that leads light from the light sources 51 to the liquid crystal panel side, and a reflector 53 placed on the back surface side of the light guide plate 52. The backlight 50 may further include a prism sheet and a diffuser sheet that are placed on the front surface side (or back surface side) of the light guide plate 52.

In the present embodiment, the liquid crystal layer 30 side surface of the first substrate 10 has steps each including an upper surface S1, a lower surface S2, and a riser S3. The upper surface S1 is present at least in a reflective region Rf and substantially flat. The lower surface S2 is present at least in a transmissive region Tr and substantially flat. The riser S3 is a portion connecting the upper surface S1 and the lower surface S2 and at an angle or orthogonal to the surface of the supporting substrate 11.

As described above, the liquid crystal display device 100 of the present embodiment includes a double electrode structure in which the reflective layer (reflective electrode) 10Rf and the pixel electrodes 10Px are separated by the second insulating layer 13. Thus, the reflective layer 10Rf can include not only the first parts 10Rf1 present in the pixels P but also the second parts 10Rf2 present between adjacent two pixels P. This can make the regions between the pixels P contribute to reflective display, so that the reflective aperture ratio (proportion of the regions contributing to display in the reflective mode in the display region AA) increases and the reflectance can be further increased. Thus, even brighter display can be provided in the reflective mode. In addition, the irregular surface structure of the reflective layer 10Rf is planarized by the second insulating layer 13 formed under the pixel electrodes 10Px and thus does not cause misalignment of liquid crystal molecules, so that alignment with high in-plane uniformity can be achieved.

Since the regions between the pixels P are designed to contribute to display in the reflective mode in the liquid crystal display device 100 of the present embodiment, the second substrate 20 preferably does not include a black matrix between any adjacent two pixels P among the pixels P.

The thicknesses (transmissive cell gaps) dt of the liquid crystal layer 30 in the transmissive regions Tr and the thickness (reflective cell gap) dr of the liquid crystal layer 30 in the reflective regions Rf are different. Specifically, the transmissive cell gaps dt are greater than the reflective cell gap dr (i.e., dt>dr). As described above, the liquid crystal display device 100 has a multi-gap structure.

While light used for display in the transmissive mode passes through the liquid crystal layer 30 only once, light used for display in the reflective mode passes through the liquid crystal layer 30 twice. Thus, making the transmissive cell gaps dt in the transmissive regions Tr greater than the reflective cell gap dr in the reflective regions Rf as in the present embodiment can increase the retardation provided by the liquid crystal layer 30 to light used for display in the transmissive mode, leading to voltage-luminance characteristics preferred (leading to brighter display) for the transmissive regions Tr. In other words, the thicknesses (transmissive cell gaps dt) of the liquid crystal layer in the transmissive regions Tr are preferably greater than the thickness (reflective cell gap dr) of the liquid crystal layer 30 in the reflective regions Rf.

A specific configuration of the liquid crystal display device 100 of the present embodiment is described below, for example.

Reflective layer 10Rf: silver alloy layer
Transparent electrode (transparent conductive layer) 10Tr, pixel electrode 10Px: ITO layer
First insulating layer 12, second insulating layer 13, second substrate side insulating layer 20T: organic insulating layer
Light blocking region Sh: 9-μm-square shape
Transmissive region Tr: region resulting from removing light blocking region Sh from 18-μm-square region
Reflective region Rf: region resulting from removing transmissive region Tr and light blocking region Sh from 41-μm-square region
Liquid crystal layer 30: negative liquid crystal material, free from chiral agent
Display mode: VA-ECB mode, twist angle 0°
Reflective cell gap dr: 2.0 μm
Transmissive cell gap dt: varying in the range from 2.0 to 3.5 μm
Counter electrode 20Com: ITO layer
Supporting substrate 11, 21: alkali-free glass substrate
Back/front polarizing plates: circularly polarizing plates, each being combination of linearly polarizing plate and phase difference plate
Backlight 50: LED backlight Embodiment 2

In the present embodiment, features unique to the present embodiment are mainly described, and description of the same features as in Embodiment 1 is omitted. The present embodiment is substantially the same as Embodiment 1, except that the second insulating layer 13 does not include the transmissive grooves 13A.

Figure 8:
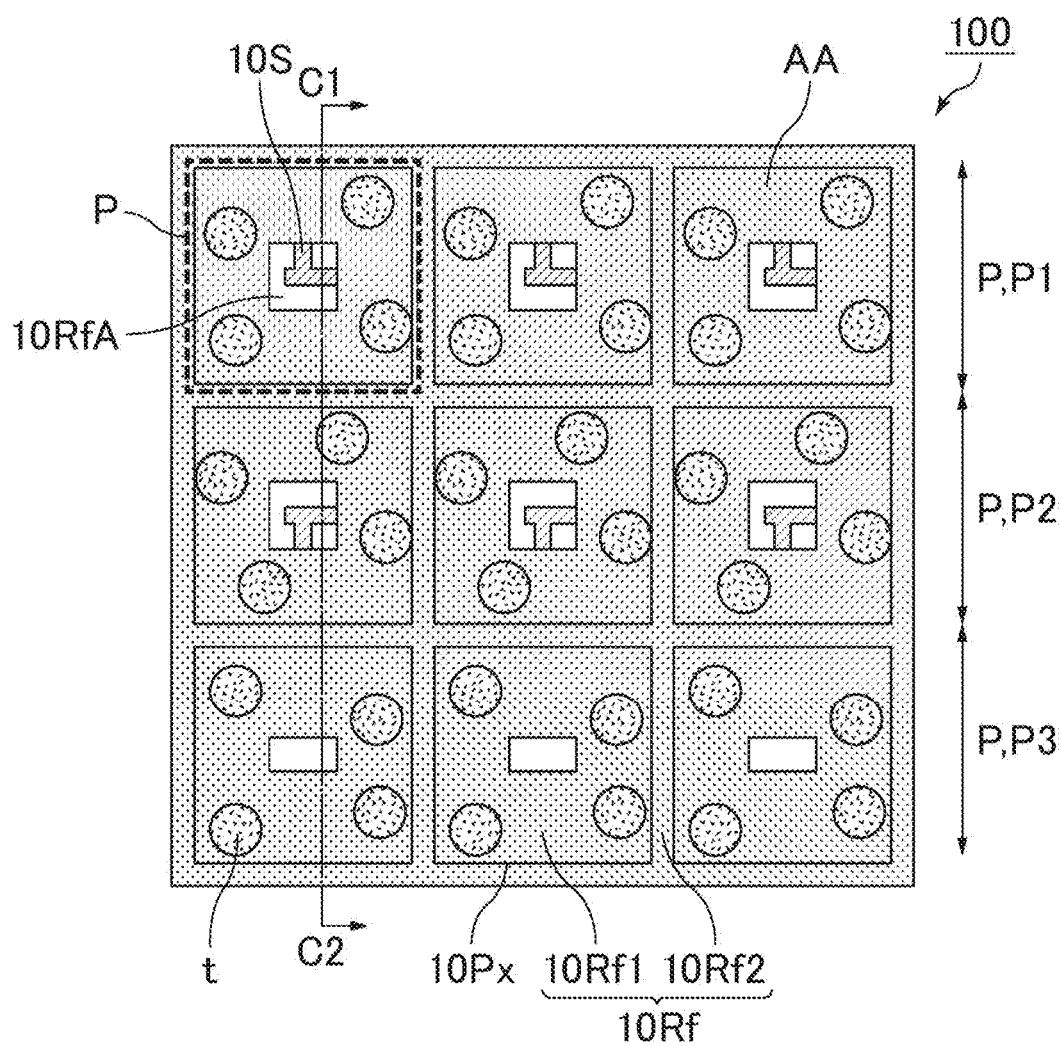
FIG. 8 is a schematic plan view of a liquid crystal display device of Embodiment 2.
Figure 9:
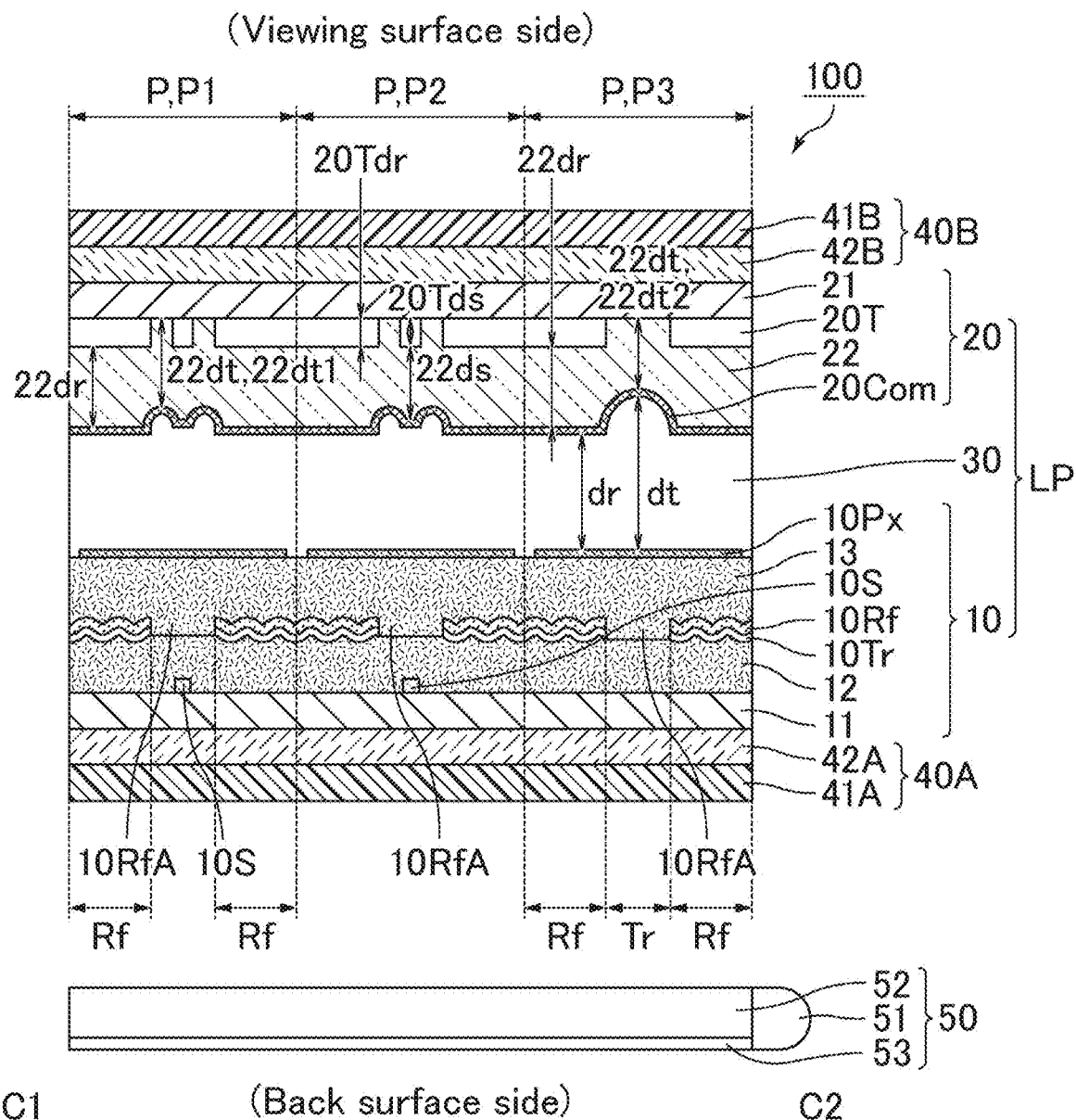
FIG. 9 is a schematic cross-sectional view taken along line C1-C2 in FIG. 8.

FIG. 8 is a schematic plan view of a liquid crystal display device of Embodiment 2. FIG. 9 is a schematic cross-sectional view taken along line C1-C2 in FIG. 8. As in Embodiment 1, the first substrate 10 in the liquid crystal display device 1 of the present embodiment includes the light blockers 10S in the light blocking regions Sh, the reflective layer 10Rf in the reflective regions Rf, the second insulating layer 13 as the insulating layer placed on the liquid crystal layer 30 side of the reflective layer 10Rf, and the pixel electrodes 10Px placed on the liquid crystal layer 30 side of the second insulating layer 13.

As shown in FIG. 8 and FIG. 9, the second insulating layer 13 does not include any transmissive groove 13A. This configuration can widen the color gamut during transmissive display as in Embodiment 1.

Also in the present embodiment, the film thicknesses of the color filter layer 22 satisfy the relationship 22dt1>22dt2>22dr.

Embodiment 3

In the present embodiment, features unique to the present embodiment are mainly described, and description of the same features as in Embodiment 1 is omitted. The present embodiment is substantially the same as Embodiment 1, except that the pixel electrodes 10Px are placed under the reflective layer 10Rf.

Figure 10:
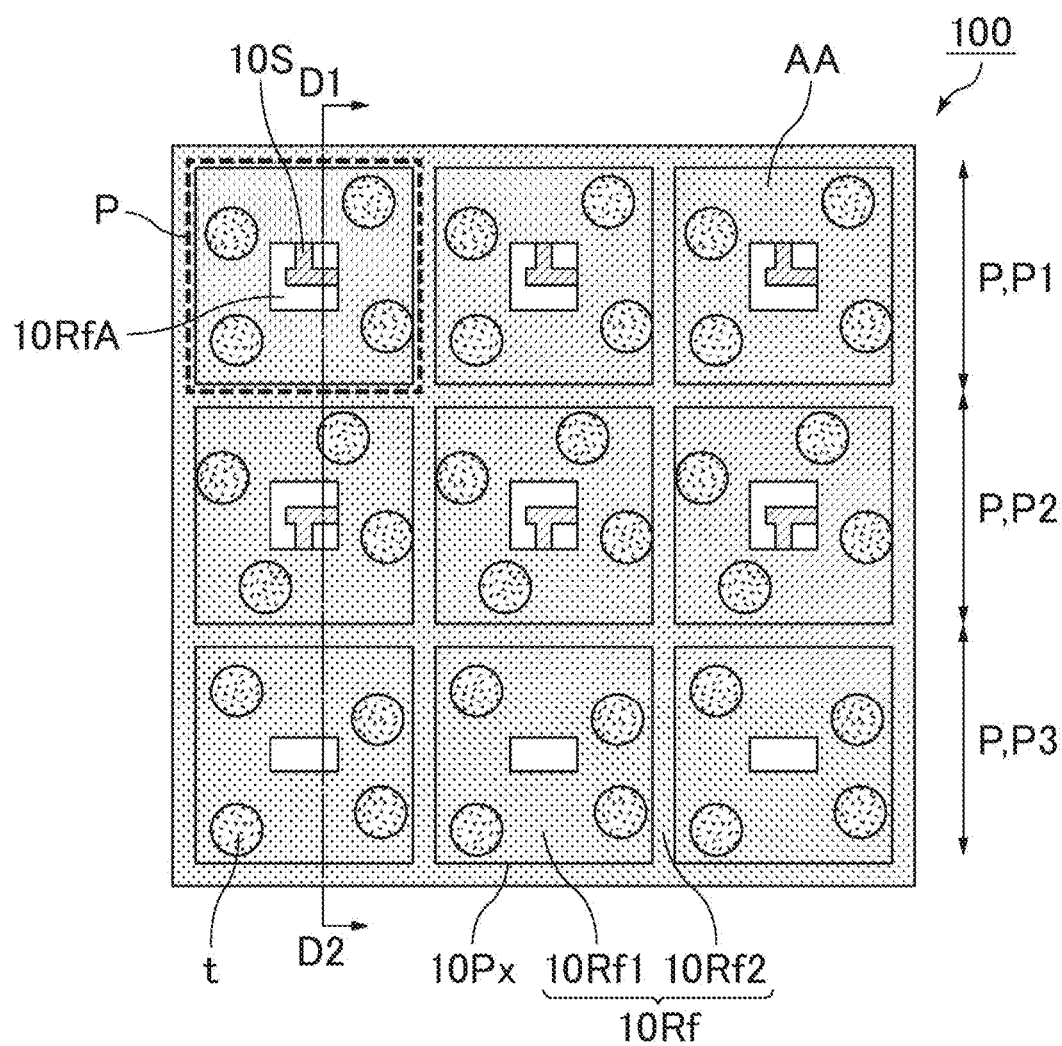
FIG. 10 is a schematic plan view of a liquid crystal display device of Embodiment 3.
Figure 11:
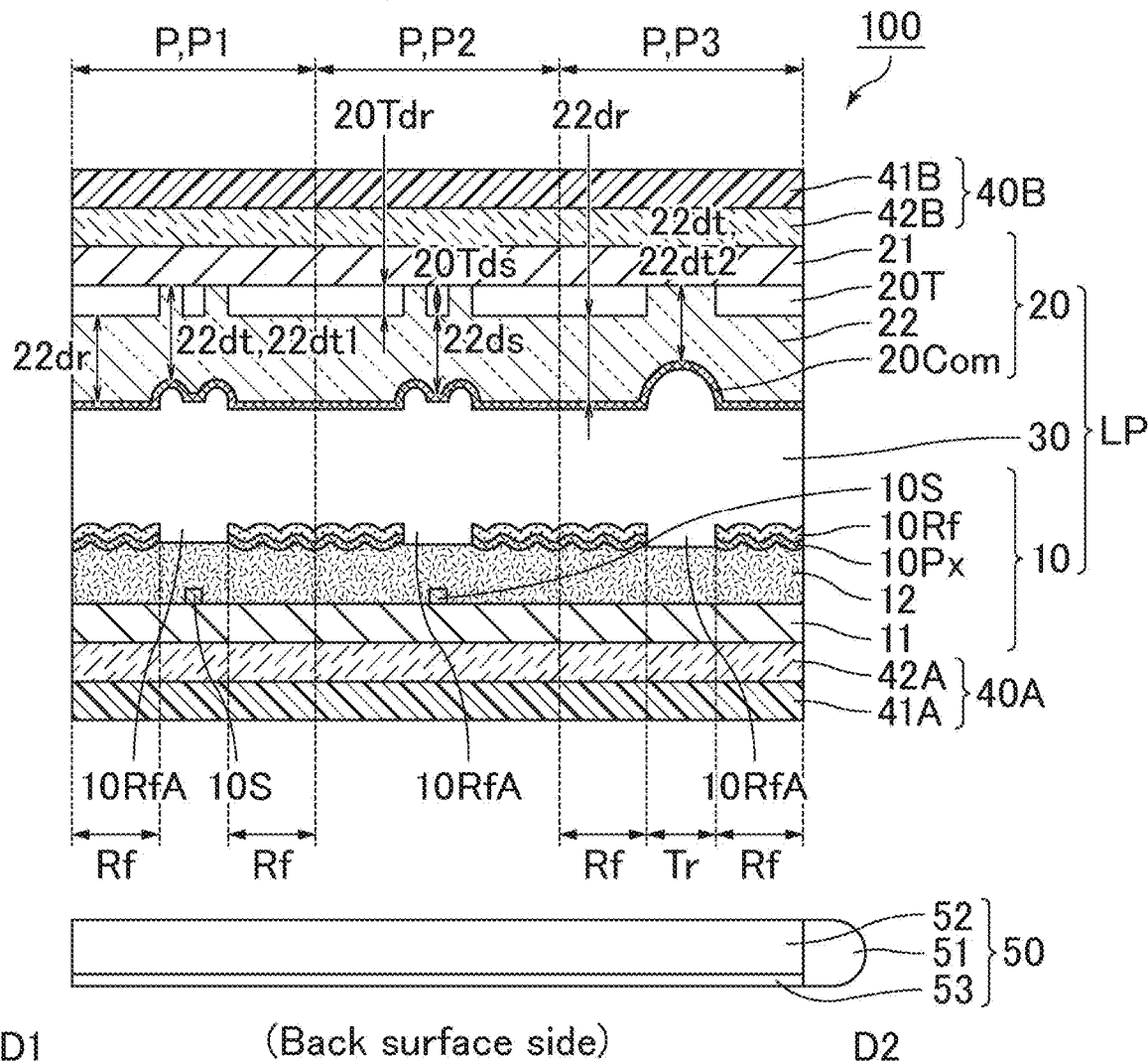
FIG. 11 is a schematic cross-sectional view taken along line D1-D2 in FIG. 10.

FIG. 10 is a schematic plan view of a liquid crystal display device of Embodiment 3. FIG. 11 is a schematic cross-sectional view taken along line D1-D2 in FIG. 10. As shown in FIG. 10 and FIG. 11, the reflective layer 10Rf in the liquid crystal display device 100 of the present embodiment is placed on the liquid crystal layer 30 side of the pixel electrodes 10Px. In other words, the first substrate 10 in the present embodiment includes the light blockers 10S in the light blocking regions Sh, the reflective layer 10Rf in the reflective regions Rf, and the pixel electrodes 10Px placed on the side of the reflective layer 10Rf opposite to the liquid crystal layer 30. This configuration can widen the color gamut for transmissive display as in Embodiment 1.

In a plan view, the pixel electrodes 10Px overlap the reflective layer 10Rf. Also in the present embodiment, the film thicknesses of the color filter layer 22 satisfy the relationship 22dt1>22dt2>22dr.

REFERENCE SIGNS LIST

10: first substrate (TFT substrate)
10Px: pixel electrode
10Px1: first pixel electrode
10Px2: second pixel electrode
10Px3: third pixel electrode
10Rf: reflective layer
10Rf1: first part
10Rf2: second part
10RfA: aperture
10S: light blocker
10Tr: transparent electrode
11, 21: supporting substrate
12: first insulating layer
12a: insulating layer
13: second insulating layer
13A: transmissive groove
20: second substrate (counter substrate)
20Com: counter electrode
20T: second substrate side insulating layer
20Tdr, 20Tds, 22dr, 22ds, 22dt, 22dt1, 22dt2: film thickness
22: color filter layer
22B: blue color filter
22G: green color filter
22R: red color filter
30: liquid crystal layer
40A: first circularly polarizing plate (back circularly polarizing plate)
40B: second circularly polarizing plate (front circularly polarizing plate)
41A: first linearly polarizing plate (back linearly polarizing plate)
41B: second linearly polarizing plate (front linearly polarizing plate)
42A: first phase difference plate
42B: second phase difference plate
50: backlight
51: light source
52: light guide plate
53: reflector
100, 100R: liquid crystal display device
AA: display region
dt: transmissive cell gap
dr: reflective cell gap
LP: liquid crystal display panel
P: pixel
P1: first pixel
P2: second pixel
P3: third pixel
Rf: reflective region
S1: upper surface
S2: lower surface
S3: riser
Sh: light blocking region
Tr: transmissive region
t: bump

What is claimed is:

1. A liquid crystal display device comprising:
a first substrate;
a second substrate opposite to the first substrate; and
a liquid crystal layer between the first substrate and the second substrate,
the liquid crystal display device including pixels arranged in a matrix pattern,
the pixels each including a reflective region in which display is provided in a reflective mode and a transmissive region in which display is provided in a transmissive mode,
at least one of the pixels further including a light blocking region inside the transmissive region surrounded by the reflective region in a plan view,
the second substrate including a second substrate side insulating layer and a color filter layer sequentially toward the liquid crystal layer,
the second substrate side insulating layer being placed in the reflective region,
a film thickness of the color filter layer in the transmissive region being greater than a film thickness of the color filter layer in the reflective region,
the first substrate includes a reflective layer provided with apertures in respective ones of the pixels and a light blocker overlapping at least one of the apertures in the plan view,
the reflective region is a region overlapping the reflective layer in the plan view,
the transmissive region is a region overlapping the apertures and not overlapping the light blocker in the plan view,
the light blocking region is a region overlapping the light blocker in the plan view, and the light blocker includes a TFT and/or a conductive line.

2. The liquid crystal display device according to claim 1, wherein a film thickness of the color filter layer in the transmissive region in the at least one pixel including the light blocking region is greater than a film thickness of the color filter layer in the transmissive region in any of the pixels without the light blocking region.

3. The liquid crystal display device according to claim 1, wherein a film thickness of the second substrate side insulating layer in the reflective region is 0.5 times or more and 2 times or less a film thickness of the color filter layer in the reflective region.

4. The liquid crystal display device according to claim 1, wherein the second substrate side insulating layer is also placed in the light blocking region, and
a film thickness of the second substrate side insulating layer in the light blocking region is 0.5 times or more and 2 times or less a film thickness of the color filter layer in the light blocking region.

5. The liquid crystal display device according to claim 1, wherein the pixels include a first pixel including a first pixel electrode, a second pixel including a second pixel electrode, and a third pixel including a third pixel electrode, and
the first pixel electrode is electrically connected to the third pixel electrode.

6. The liquid crystal display device according to claim 5, wherein the first pixel, the second pixel, and the third pixel define a sub-pixel.

7. The liquid crystal display device according to claim 5, wherein the second pixel electrode is adjacent to the first pixel electrode, and
the third pixel electrode is placed on a side of the second pixel electrode opposite to the first pixel electrode.

8. The liquid crystal display device according to claim 1, wherein the first substrate includes a light blocker placed in the light blocking region, a reflective layer placed in the reflective region, an insulating layer placed on a liquid crystal layer side of the reflective layer, and a pixel electrode placed on a liquid crystal layer side of the insulating layer.

9. The liquid crystal display device according to claim 8, wherein the insulating layer is provided with a transmissive groove in the transmissive region.

10. The liquid crystal display device according to claim 1, wherein the first substrate includes a light blocker placed in the light blocking region, a reflective layer placed in the reflective region, and a pixel electrode placed on a side of the reflective layer opposite to the liquid crystal layer.

11. The liquid crystal display device according to claim 1, wherein a thickness of the liquid crystal layer in the transmissive region is greater than a thickness of the liquid crystal layer in the reflective region.

12. A liquid crystal display device comprising:
a first substrate;
a second substrate opposite to the first substrate; and
a liquid crystal layer between the first substrate and the second substrate,
the liquid crystal display device including pixels arranged in a matrix pattern,
the pixels each including a reflective region in which display is provided in a reflective mode and a transmissive region in which display is provided in a transmissive mode,
at least one of the pixels further including a light blocking region inside the transmissive region surrounded by the reflective region in a plan view,
the second substrate including a second substrate side insulating layer and a color filter layer sequentially toward the liquid crystal layer,
the second substrate side insulating layer being placed in the reflective region,
a film thickness of the color filter layer in the transmissive region being greater than a film thickness of the color filter layer in the reflective region,
the pixels include a first pixel including a first pixel electrode, a second pixel including a second pixel electrode, and a third pixel including a third pixel electrode,
the first pixel electrode is directly electrically connected to the third pixel electrode,
the second pixel electrode is adjacent to the first pixel electrode,
the third pixel electrode is opposite to the first pixel electrode across the second pixel electrode,
the first pixel and the second pixel include the light blocking region, and
the third pixel does not include the light blocking region.

13. The liquid crystal display device according to claim 1, wherein
the light blocking region overlaps a center of the at least one of the pixels including the light blocking region in the plan view.

14. The liquid crystal display device according to claim 1, wherein
the first substrate includes a reflective layer provided with apertures in the respective pixels and a light blocker overlapping at least one of the apertures in the plan view,
the reflective region is a region overlapping the reflective layer in the plan view,
the transmissive region is a region overlapping the apertures and not overlapping the light blocker in the plan view,
the light blocking region is a region overlapping the light blocker in the plan view, and an area of an aperture in a pixel including the light blocking region is larger than an area of an aperture in a pixel not including the light blocking region.

15. A liquid crystal display device comprising:
a first substrate;
a second substrate opposite to the first substrate; and
a liquid crystal layer between the first substrate and the second substrate,
the liquid crystal display device including pixels arranged in a matrix pattern,
the pixels each including a reflective region in which display is provided in a reflective mode and a transmissive region in which display is provided in a transmissive mode,
at least one of the pixels further including a light blocking region inside the transmissive region surrounded by the reflective region in a plan view,
the second substrate including a second substrate side insulating layer and a color filter layer sequentially toward the liquid crystal layer,
the second substrate side insulating layer being placed in the reflective region, a film thickness of the color filter layer in the transmissive region being greater than a film thickness of the color filter layer in the reflective region, and the second substrate does not include a black matrix between any two adjacent pixels among the pixels.

* * * * *